US009013460B2

(12) United States Patent
Kim

(10) Patent No.: US 9,013,460 B2
(45) Date of Patent: Apr. 21, 2015

(54) DISPLAY DEVICE AND DRIVING METHOD THEREOF

(75) Inventor: Hyung-Soo Kim, Yongin (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 725 days.

(21) Appl. No.: 12/982,179

(22) Filed: Dec. 30, 2010

(65) Prior Publication Data

US 2011/0175881 A1 Jul. 21, 2011

(30) Foreign Application Priority Data

Jan. 21, 2010 (KR) ........................ 10-2010-0005588

(51) Int. Cl.

*G09G 5/00* (2006.01)
*G06F 3/038* (2013.01)
*G09G 3/32* (2006.01)

(52) U.S. Cl.

CPC ............ *G09G 3/3225* (2013.01); *G09G 3/3283* (2013.01); *G09G 3/3291* (2013.01); *G09G 2300/0819* (2013.01); *G09G 2300/0852* (2013.01); *G09G 2300/0861* (2013.01); *G09G 2310/08* (2013.01)

(58) Field of Classification Search

None
See application file for complete search history.

(56) References Cited

U.S. PATENT DOCUMENTS 4,931,954 A * 6/1990 Honda et al. .................. 345/428
2007/0040786 A1* 2/2007 Chung ............................ 345/92
2008/0122816 A1* 5/2008 Park et al. ..................... 345/204
2008/0158114 A1* 7/2008 Kim ............................... 345/77
2009/0135107 A1* 5/2009 Kim ............................... 345/76

FOREIGN PATENT DOCUMENTS

KR 10-2006-0104843 A 10/2006
KR 10-2007-0115261 A 12/2007
KR 10-0821055 B1 4/2008
KR 10-2009-0122699 A 12/2009

OTHER PUBLICATIONS

Korean Notice of Allowance dated Jun. 9, 2011 for Korean Patent Application No. KR 10-2010-0005588 which corresponds to captioned U.S. Appl. No. 12/982,179.

* cited by examiner

*Primary Examiner* — Jesus Hernandez

(74) *Attorney, Agent, or Firm* — Knobbe, Martens, Olson & Bear, LLP

(57) ABSTRACT

A display device and a method of driving the display device are disclosed. The display device includes first and second data drivers. The first data driver is configured to generate data voltages for the pixels based on first image data. The second data driver is configured to generate current voltages for the pixels based on second image data. One of the first and second data drivers may be disposed outside of a display panel.

18 Claims, 3 Drawing Sheets

DISPLAY DEVICE AND DRIVING METHOD THEREOF

CROSS-REFERENCE TO RELATED APPLICATIONS

This application claims priority to and the benefit of Korean Patent Application No. 10-2010-0005588 filed in the Korean Intellectual Property Office on Jan. 21, 2010, the entire contents of which are incorporated herein by reference.

BACKGROUND

1. Field

The disclosed technology relates generally to a display device and a driving method thereof More particularly, the disclosed technology relates generally to an organic light emitting diode (OLED) display and a driving method thereof.

2. Description of the Related Technology

A display device includes a display panel which has a plurality of pixels arranged in a matrix. The display panel includes a plurality of scan lines formed in a row direction and a plurality of data lines formed in a column direction. The plurality of scan lines and the plurality of data lines cross each other. Each of the plurality of pixels is driven by a scan signal and a data signal transmitted from a corresponding scan line and data line.

The display device is either a passive matrix type of light emitting display device or an active matrix type of light emitting display device according to a driving scheme of the pixels. Active matrix displays, in which pixels are selectively lit according to resolution, contrast, and operation speed, are primarily used.

The display device is used as a display device of portable information terminals such as a personal computer, a mobile phone, a PDA, or the like, or monitors of various types of information equipment. An LCD using a liquid crystal panel, an organic light emitting display device using an organic light emitting device, a PDP using a plasma panel, etc., are known. In recent years, various light emitting display devices having smaller weight and volume than cathode ray tubes have been developed, and in particular, the organic light emitting display device has excellent emission efficiency, luminance, viewing angle, and rapid response speed and has attracted public attention.

The driving method of the organic light emitting diode (OLED) display includes a voltage driving method and a current driving method. The voltage driving method divides a predetermined voltage into a plurality of gray voltages, and one of the divided gray voltages is applied to the pixel as one data signal thereby displaying an image. This voltage driving method has a limit for displaying uniform images due to the characteristic deviation of the driving transistor provided in each pixel.

In contrast, the current driving method supplies a predetermined current as the data signal to the pixel, thereby displaying the image. The current driving method may display uniform images regardless of the characteristic deviation of the driving transistor. However, it is difficult to charge the desired voltage to the pixel during the required time in the current driving method. Accordingly, it is difficult to apply the current driving method to a display device of a large area, and a plurality of gray scales displayed through fine currents to display images of a high resolution.

The above information disclosed in this Background section is only for enhancement of understanding of the background of the described technology and therefore it may contain information that does not form the prior art that is already known in this country to a person of ordinary skill in the art.

SUMMARY OF CERTAIN INVENTIVE ASPECTS

One aspect is a display device, which includes a display unit disposed inside a display panel. The display unit includes a plurality of scan lines configured to transmit a plurality of scan signals, a plurality of data lines configured to transmit a plurality of data voltages, a plurality of light emitting signal lines configured to transmit a plurality of light emitting signals, a plurality of sink current lines configured to sink data currents, and a plurality of pixels each connected to the plurality of scan lines, the plurality of data lines, the plurality of light emitting signal lines, and the plurality of sink current lines. The device also includes a first data driver configured to generate the plurality of data voltages based on first image data, and to apply the data voltages to the plurality of data lines, and a second data driver configured to generate the plurality of data currents based on second image data, and to apply the data currents to the plurality of sink current lines. One of the first and second data drivers is disposed outside of the display panel.

Another aspect is a method of driving a display device. The display device includes a display unit disposed inside a display panel, where the display unit includes a plurality of scan lines configured to transmit a plurality of scan signals, a plurality of data lines configured to transmit a plurality of data voltages, a plurality of light emitting signal lines configured to transmit a plurality of light emitting signals, a plurality of sink current lines configured to sink a plurality of data currents, and a plurality of pixels respectively connected to the plurality of scan lines, the plurality of data lines, the plurality of light emitting signal lines, and the plurality of sink current lines. The method includes receiving an input signal, generating first and second image data based on the input signal according to a ratio, converting the first image data into a data voltage and the second image data into a data current, and simultaneously transmitting the data voltage and the data current to a selected one of the pixels when the scan signal is applied to the selected pixel.

Another aspect is a display device, which includes a light emitting device, a first data driver, configured to generate a voltage data signal based on first image data, a second data driver, configured to generate a current data signal based on second image data, and a pixel. The pixel includes a first capacitor, configured to store the voltage data signal, a second capacitor, configured to store a voltage generated based on the current data signal, and a driving transistor, configured to generate a driving current for the light emitting device. The light emitting device is configured to emit light according to the driving current, and the first and second data drivers are configured to simultaneously apply the voltage data signal and the current data signal to the pixel.

DETAILED DESCRIPTION OF CERTAIN INVENTIVE EMBODIMENTS

Figure 1:
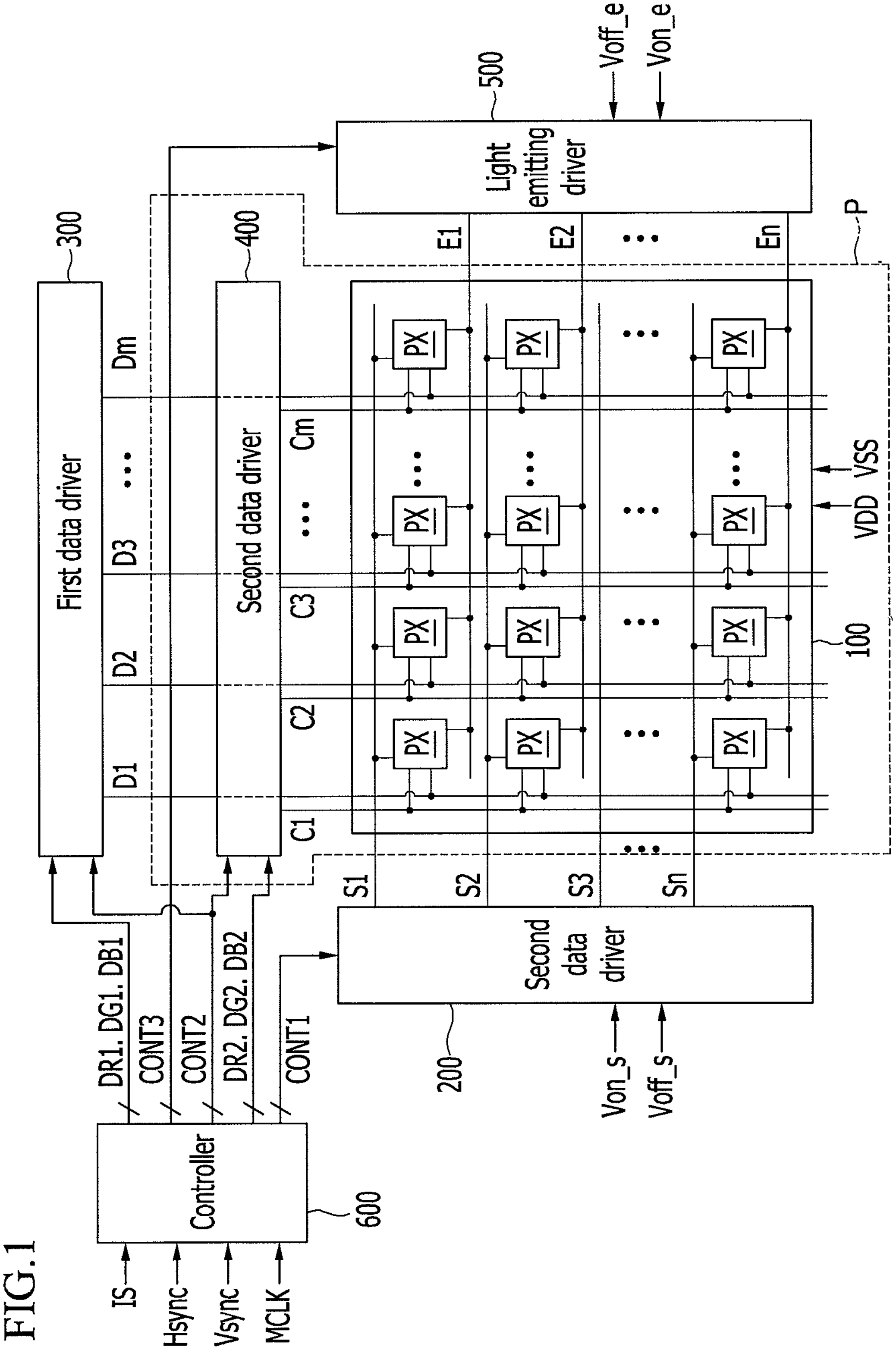
FIG. 1 is a schematic of a display device according to an exemplary embodiment.

In the following detailed description, only certain exemplary embodiments have been shown and described, simply by way of illustration. As those skilled in the art would realize, the described embodiments may be modified in various ways, all without departing from the spirit or scope of the present invention. Accordingly, the drawings and description are to be regarded as illustrative in nature and not restrictive. Like reference numerals generally designate like elements throughout the specification.

Throughout this specification and the claims that follow, when it is described that an element is "coupled" to another element, the element may be directly coupled to the other element or coupled to the other element through a third element. In addition, unless explicitly described to the contrary, the word "comprise" and variations such as "comprises" or "comprising" will be understood to imply the inclusion of stated elements but not the exclusion of any other elements.

FIG. 1 is a schematic of a display device according to an exemplary embodiment.

Referring to FIG. 1, a display device includes a display unit 100, a scan driver 200, first and second data drivers 300 and 400, a light emission driver 500, and a controller 600. The display unit 100 and the second data driver 400 are positioned in a display panel P, and the scan driver 200, the first data driver 300, the light emission driver 500, and the controller 600 are positioned outside the display panel P.

In FIG. 1, the first data driver 300 is positioned outside the display panel P, however the present invention is not limited thereto, and the first data driver 300 may be disposed inside the display panel P and the second data driver 400 may be disposed outside the display panel P.

The display unit 100 includes a plurality of signal lines S1 to Sn, D1 to Dm, E1 to Es, and C1 to Ck, and a plurality of pixels PX that are connected to the signal lines and are arranged in a matrix form.

The signal lines S1-Sn, D1-Dm, E1-En, and C1-Cm include a plurality of scan lines S1-Sn transferring scan signals, a plurality of data lines D1-Dm transferring data voltages, a plurality of light emitting signal lines E1-En transferring light emitting signals, and a plurality of current sink lines C1-Cm through which data currents are sunk.

The plurality of scan lines S1-Sn and the plurality of light emitting signal lines E1-En extend substantially in a row direction and are substantially parallel to each other, and the plurality of data lines D1-Dm and the plurality of current sink lines C1-Cm extend substantially in a column direction and are substantially parallel to each other.

Figure 2:
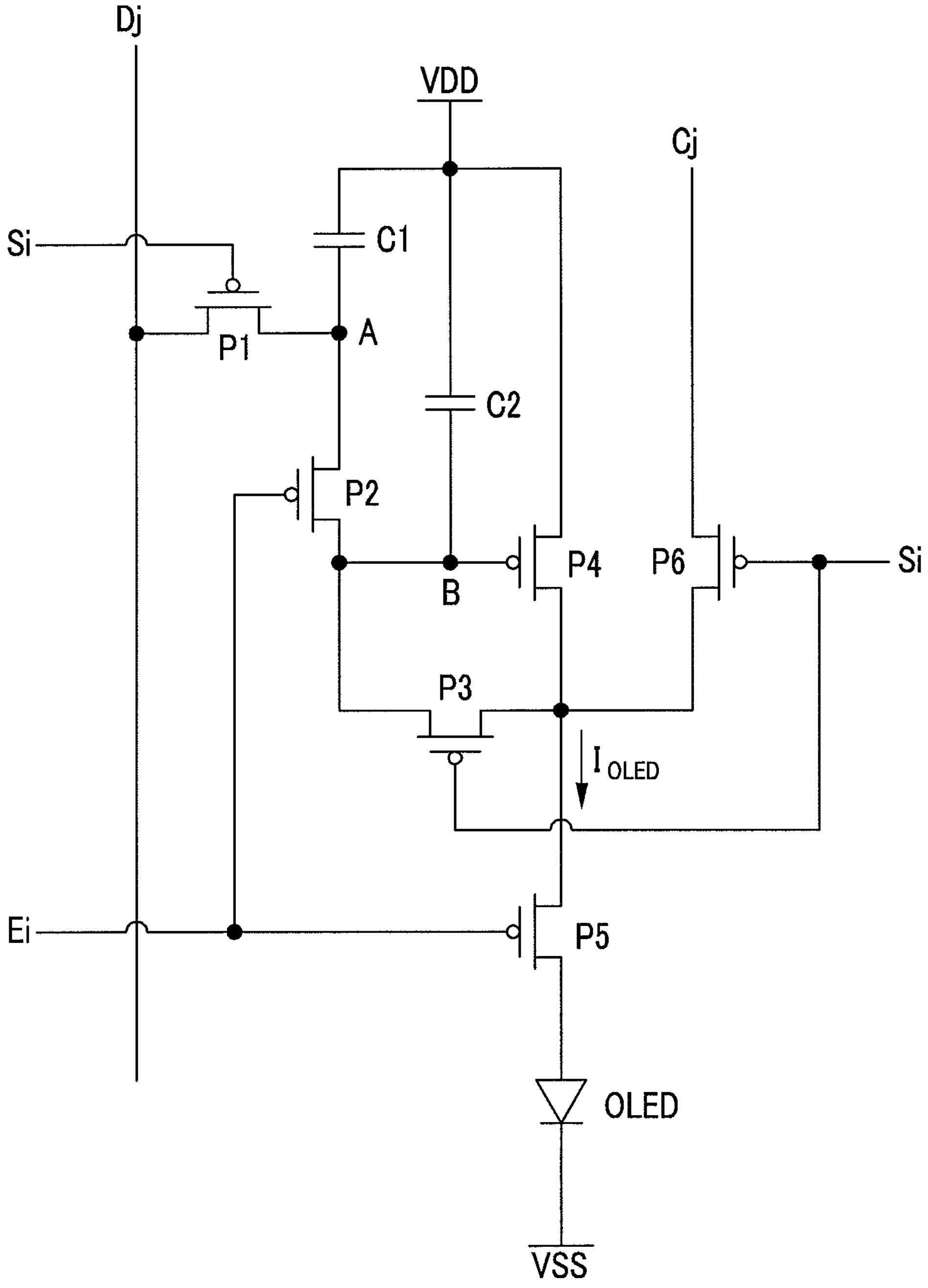
FIG. 2 is a schematic of a pixel according to an exemplary embodiment.

FIG. 2 is schematic of a pixel according to an exemplary embodiment of the present invention.

Referring to FIG. 2, each pixel PX, for example the pixel PXij connected to the i-th (i=1, 2, . . . , n) scan line Si and the j-th (j=1, 2, . . . , m) data line Dj includes an organic light emitting diode (OLED), first to sixth transistors P1-P6, and first and second capacitors C1 and C2.

The first transistor P1 includes a gate terminal connected to the scan line S1 and a source terminal connected to the data line Dj. The first transistor P1 is switching-operated according to the scan signal transmitted through the scan line Si, and the data voltage from the data line Dj is transmitted to a node A when the first transistor P1 is turned on.

The second transistor P2 includes a gate terminal connected to the light emitting signal line Ei and a source terminal connected to the drain terminal of the first transistor P1. The second transistor P2 is switching-operated according to the light emitting signal transmitted through the light emitting signal line Ei, and the node A is electrically connected to the node B when the second transistor P2 is turned on.

The third transistor P3 includes a gate terminal connected to the scan line Si and a drain terminal connected to the drain terminal of the second transistor P2. The third transistor P3 is switching-operated according to the scan signal transmitted through the scan line Si, and the transistor P4 is diode-connected when the third transistor P3 is turned on.

The fourth transistor P4 includes a gate terminal connected to node B, a source terminal connected to the power source voltage VDD terminal, and a drain terminal connected to the source terminal of the third transistor P3. The fourth transistor P4 supplies the driving current $I_{OLED}$ corresponding to the voltage of the node B to the organic light emitting diode (OLED) through the fifth transistor P5.

The fifth transistor P5 includes a gate terminal connected to the light emitting signal line Ei and a source terminal connected to the drain terminal of the fourth transistor P4. The second transistor P2 is switching-operated according to the light emitting signal transmitted through the light emitting signal line Ei, and the driving current $I_{OLED}$ is supplied to the OLED when the fifth transistor P5 is turned on.

The sixth transistor P6 includes a gate terminal connected to the scan line Si, a drain terminal connected to the sink current line Cj, and a source terminal connected to the drain terminal of the transistor P4. The sixth transistor P6 is switching-operated according to the scan signal transmitted through the scan line Si, and the drain terminal of the fourth transistor P4 is connected to the current sink line Cj when the sixth transistor P6 is turned on.

The first capacitor C1 includes one terminal connected to the power source voltage VDD terminal and another terminal connected to node A. If the node A is applied with the data voltage, charge is stored in the first capacitor C1 according to the data voltage.

The second capacitor C2 includes one terminal connected to the power source voltage VDD terminal and another terminal connected to node B. The second capacitor C2 is charged with the voltage corresponding to the data current that flows through the current sink line Cj.

The organic light emitting diode (OLED) includes an anode terminal connected to the drain terminal of the transistor P5 and a cathode terminal connected to the power source voltage (VSS) terminal. The organic light emitting diode OLED emits light at different intensities according to the driving current $I_{OLED}$ supplied by the fourth transistor P4 through the fifth transistor P5.

The voltage of the node A is determined according to the data voltage and is stored by the first capacitor C1. When the second transistor P2 is off, the voltage of the node B is determined according to the data current and is maintained by the second capacitor C2. Once the second transistor P2 is turned on, the node A and the node B are connected and the voltage of the gate terminal of the fourth transistor P4 is determined based on the voltages at the nodes A and B and the values of the first and second capacitors C1 and C2.

The first to sixth transistors P1-P6 shown in FIG. 2 are p-channel field effect transistors (FET). Accordingly, if the signals are at a low level, the first to sixth transistors P1-P6 are turned on, and if the signals are at a high level, the first to sixth transistors P1-P6 are turned off. However, the present invention is not limited thereto, and at least one of the first to sixth transistors P1-P6 may be an n-channel field effect transistor.

Also, the connection relationship of the first to sixth transistors P1-P6, the first capacitor C1, the second capacitor C2, and the organic light emitting diode (OLED) may be changed. The pixel PXij shown in FIG. 2 is one example of a pixel for the display device, and, for example, a pixel having at least two transistors and at least one capacitor may be used.

Referring again to FIG. 1, the scan driver 200 is connected to the scan lines S1 to Sn of the display unit 100, and sequentially applies the scan signals S1 to Sn in accordance with a scan control signal CONT1 from the controller 600. The scan signal includes a scan-on voltage Von_s of the low level that turns on the first, third, and the sixth transistors P1, P3, and P6 and a scan-off voltage Voff_s of the high level that turns off the first, third, and sixth transistors P1, P3, and P6.

The first data driver 300 is connected to the data lines D1 to Dm of the display unit 100, and generates data voltages according to the first image data DR1, DG1, and DB1 input from the controller 600 and supplies the data voltages to the data lines D1 to Dm in accordance with a data control signal CONT2 from the controller 600.

The second data driver 400 is connected to the current sink lines C1-Cm of the display unit 100, and generates data currents according to the second image data DR2, DG2, and DB2 input from the controller 600 and supplies the data currents to the current sink lines C1-Cm in accordance with data control signal CONT2 from the controller 600.

The light emission driver 500 is connected to the light emitting signal lines E1-En of the display unit 100, and sequentially applies the light emitting signals to the light emitting signal lines E1-En according to the light emission control signal CONT3. The light emitting signal includes a light emitting on voltage Von_e of a low level that turns on the second and the fifth transistors P2 and P5 and a light emitting off voltage Voff_e of a high level that turns off the second and fifth transistors P2 and P5.

The controller 600 receives input signals R, G, and B, a horizontal synchronization signal Hsync, a vertical synchronization signal Vsync, and a main clock signal MCLK, and generates first image data DR1, DG1, and DB1, second image data DR2, DG2, and DB2, a scan control signal CONT1, a data control signal CONT2, and a light emission control signal CONT3. The controller 600 according to an exemplary embodiment uses the image data corresponding to the input signals R, G, and B to generate the first image data DR1, DG1, and DB1 and the second image data DR2, DG2, and DB2 according to a predetermined ratio. For example, when 256 grayscales are realized as 8 bits and the ratio is determined to be 50%, the first image data DR1, DG1, and DB1 correspond to the upper 4 bits and the second image data DR2, DG2 and DB2 correspond to the lower 4 bits. The present invention is not limited to the ratio of 50%, and it may be changed according to the design.

The scan control signal CONT1 includes a scanning start signal for indicating scanning start and at least one clock signal for controlling the output period of the scan-on voltage Von_s. The scan control signal CONT1 may further include an output enable signal that defines a lasting time of the scan-on voltage Von_s.

The data control signal CONT2 includes the data clock signal HCLK, a horizontal synchronization start signal for notifying of start of transfer of the first image data DR1, DG1, and DB1 and the second image data DR2, DG2, and DB2 for a row of pixels PX to the first and second data drivers 300 and 400, and a load signal that results in the application of the data voltage and the data current to the data line D1-Dm and the current sink lines C1-Cm.

The light emission control signal CONT3 includes a light emitting start signal for signaling the pixels to start emitting light and at least one clock signal for controlling the output period of the light emitting on voltage Von_e. The light emission control signal CONT3 may further include an output enable signal that defines a duration of the light emitting on voltage Von_e.

Figure 3:
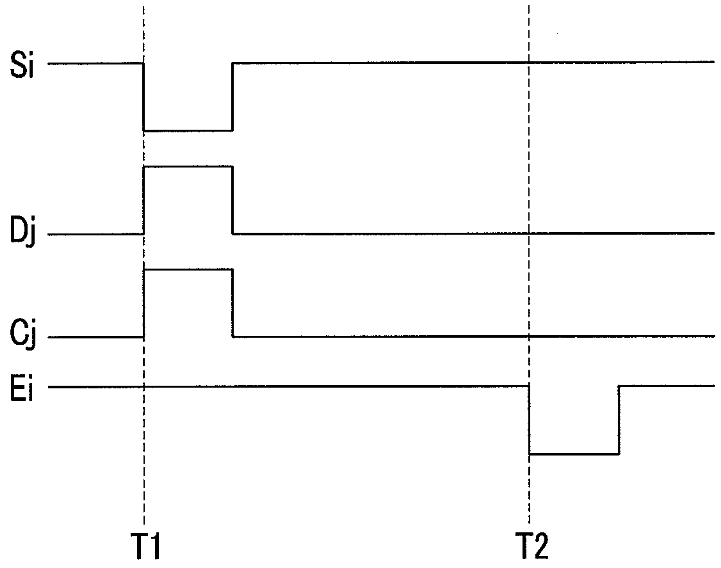
FIG. 3 is a waveform diagram showing a driving method of a display device according to an exemplary embodiment.

FIG. 3 is a waveform diagram of a driving method of a display device according to an exemplary embodiment.

Referring to FIG. 3, the scan signal is applied to the scan line Si at a time T1, and the first, third, and sixth transistors P1, P3, and P6 are turned on. Because the first transistor P1 is turned on, the data voltage supplied to the data line Dj is transmitted to the node A. Because the third transistor P3 is turn on, the fourth transistor P4 is diode-connected. Thus, the data current is sunk from the power source voltage VDD through the diode-connected fourth transistor P4, the turned-on sixth transistor P6, and the current sink lines Cj. As a result, the voltage corresponding to the data current that flows in the fourth transistor P4 is generated and maintained at the node B.

The data current flows through the fourth transistor P4 such that the voltage applied to the node B is the voltage which compensates for any deviation in transistor parameters of the fourth transistor P4, such as the threshold voltage and the mobility. As described above, the data voltage is transmitted to the node A and the data current is also transmitted to the node B during the time that the scan line Si is applied with the scan signal.

At the time T2, the first, third, and sixth transistors P1, P3, and p6 are off. The light emitting signal line Ei transmits the light emitting signal, and the second and fifth transistors P2 and P5 are turned on. Because the second transistor P2 is turned on, the node A and the node B are electrically connected to each other such that the charge on each of the first and second capacitors is shared. The voltage at the nodes A and B will be the total charge divided by the sum of the capacitances ($V=q/(C1+C2)$). The fourth transistor P4 then generates the driving current $I_{OLED}$ corresponding to the voltage at nodes A and B, and the driving current $I_{OLED}$ is supplied to the organic light emitting diode OLED through the fifth transistor P5.

The third and sixth transistors P3 and P6 are switched by the scan signal applied to the scan line Si in the exemplary embodiment. In contrast, the third and sixth transistors P3 and P6 can be switched by the scan signal applied to the scan line S[i−1].

As described above, the display device according to an exemplary embodiment uses a dual driving scheme in which the current driving method and the voltage driving method are mixed, and one of the first data driver 300 outputting the data voltage and the second data driver 400 outputting the data current is disposed outside the display panel P such that each pixel PX may be simultaneously supplied with the data voltage and the data current. Accordingly, the time needed to compensate for the deviation in transistor parameters of the transistor P4 is not cumulative with the time needed to apply the data voltage. Accordingly, the driving time is fast and an image having uniform luminance may be displayed. Also, no switch for selectively transmitting the data voltage and the data current is used, and an area advantage is also achieved.

While the disclosure invention has been described in connection with what is presently considered to be practical exemplary embodiments, it is to be understood that the invention is not limited to the disclosed embodiments, but, on the contrary, is intended to cover various modifications and equivalent arrangements.

What is claimed is:

1. A display device comprising:

a display unit disposed inside a display panel and including a plurality of scan lines configured to transmit a plurality of scan signals, a plurality of data lines configured to transmit a plurality of data voltages, a plurality of light emitting signal lines configured to transmit a plurality of light emitting signals, a plurality of sink current lines configured to sink data currents, and a plurality of pixels each connected to the plurality of scan lines, the plurality of data lines, the plurality of light emitting signal lines, and the plurality of sink current lines;

a first data driver configured to generate the plurality of data voltages based on first image data, and to apply the data voltages to the plurality of data lines; and a second data driver configured to generate the plurality of data currents based on second image data, and to apply the data currents to the plurality of sink current lines, wherein one of the first and second data drivers is disposed outside of the display panel, wherein the first and second image data are based on an input signal comprising grayscale information represented by a plurality of bits, wherein the first image data corresponds to only the most significant bits of the input signal, and wherein the second image data corresponds to only the least significant bits of the input signal.

2. The display device of claim 1, wherein the first and second data drivers are configured to simultaneously apply one of the data voltages and one of the data currents to a selected one of the pixels when a scan signal is applied to the selected pixel.

3. The display device of claim 1, further comprising:

a controller configured to receive the input signal and to generate the first and second image data based on the input signal according to a ratio.

4. The display device of claim 1, wherein each of the plurality of pixels comprises:

an organic light emitting diode (OLED);

a first transistor configured to operate according to one of the scan signals to selectively transmit the data voltage to a first node;

a second transistor configured to operate according to one of the light emitting signals to selectively connect the first node to a second node;

a fourth transistor configured to generate a driving current according to a voltage of the second node;

a third transistor configured to operate according to the scan signal to selectively diode-connect the fourth transistor;

a fifth transistor configured to operate according to the light emitting signal to selectively transmit the driving current to the organic light emitting diode (OLED);

a sixth transistor configured to operate according to the scan signal to selectively connect the current sink line and the third transistor;

a first capacitor including one terminal connected to the first power source voltage terminal and another terminal connected to the first node; and a second capacitor including one terminal connected to the first power source voltage terminal and another terminal connected to the second node.

5. The display device of claim 4, wherein the driving current corresponds to the voltage at the second node when the light emitting signal is applied.

6. A method of driving a display device, the display device including a display unit disposed inside a display panel and including a plurality of scan lines configured to transmit a plurality of scan signals, a plurality of data lines configured to transmit a plurality of data voltages, a plurality of light emitting signal lines configured to transmit a plurality of light emitting signals, a plurality of sink current lines configured to sink a plurality of data currents, and a plurality of pixels respectively connected to the plurality of scan lines, the plurality of data lines, the plurality of light emitting signal lines, and the plurality of sink current lines, the method comprising:

receiving an input signal comprising grayscale information represented by a plurality of bits;

generating first and second image data based on the input signal according to a ratio, wherein the first image data corresponds to only the most significant bits of the input signal and wherein the second image data corresponds to only the least significant bits of the input signal;

converting the first image data into a data voltage and the second image data into a data current; and simultaneously transmitting the data voltage and the data current to a selected one of the pixels when the scan signal is applied to the selected pixel.

7. The method of claim 6, further comprising generating a driving current according to the data voltage and to the data current.

8. The method of claim 7, further comprising, emitting light with the selected pixel according to the driving current when a light emitting signal is applied to the selected pixel.

9. The method of claim 6, wherein one of the data voltage and the data current is transmitted to the selected pixel from the outside of the display panel.

10. A display device comprising:

a light emitting device;

a first data driver, configured to generate a voltage data signal based on first image data;

a second data driver, configured to generate a current data signal based on second image data; and a pixel comprising:

a first capacitor, configured to store the voltage data signal, a second capacitor, configured to store a voltage generated based on the current data signal, and a driving transistor, configured to generate a driving current for the light emitting device, wherein the light emitting device is configured to emit light according to the driving current, wherein the first and second data drivers are configured to simultaneously apply the voltage data signal and the current data signal to the pixel, wherein the first and second image data are based on an input signal comprising grayscale information represented by a plurality of bits, wherein the first image data corresponds to only the most significant bits of the input signal, and wherein the second image data corresponds to only the least significant bits of the input signal.

11. The display device of claim 10, wherein the pixel further comprises a diode connection transistor, configured to selectively diode-connect the driving transistor.

12. The display device of claim 11, wherein the pixel further comprises:

a voltage data select transistor configured to selectively connect the first capacitor to the first data driver; and a current data select transistor configured to selectively connect the driving transistor to the second data driver, wherein the second capacitor is connected to the gate of the driving transistor.

13. The display device of claim 12, wherein the pixel further comprises:

a capacitor transistor, configured to selectively connect the first capacitor to the gate of the driving transistor; and an emission transistor, configured to selectively connect the light emitting device to the driving transistor.

14. The display device of claim 13, wherein:

the diode connection transistor is configured to diode connect the driving transistor according to a voltage of a scan line;

the voltage data select transistor is configured to connect the first capacitor to the first data driver according to the voltage of the scan line; and the current data select transistor is configured to connect the driving transistor to the second data driver according to the voltage of the scan line.

15. The display device of claim 14, wherein:

the capacitor transistor is configured to connect the first capacitor to the gate of the driving transistor according to the voltage of a light emitting signal line; and the emission transistor is configured to connect the light emitting device to the driving transistor according to the voltage of the light emitting signal line.

16. The display device of claim 10, further comprising a display panel, wherein the display panel comprises:

the pixel; and one of the first and second data drivers, wherein the display panel does not comprise the other of the first and second data drivers.

17. The display device of claim 10, wherein the total number of bits of the first image data and the second image data is equal to the number of bits in the input signal.

18. The display device of claim 13, wherein the driving transistor, the diode connection transistor, the voltage data select transistor, the current data select transistor, the emission transistor, and the capacitor transistor have the same channel type.

* * * * *